United States Patent [19]

Trotter et al.

[11] 4,022,728

[45] May 10, 1977

[54] HOT MELT PRESSURE SENSITIVE ADHESIVES

[75] Inventors: Jimmy R. Trotter; Frederick D. Petke, both of Kingsport, Tenn.

[73] Assignee: Eastman Kodak Company, Rochester, N.Y.

[22] Filed: June 10, 1975

[21] Appl. No.: 585,639

[52] U.S. Cl. ...................... 260/27 R; 260/33.6 PQ; 260/889; 260/897 A

[51] Int. Cl.$^2$ ................... C08L 23/12; C08L 23/14

[58] Field of Search ........... 260/897, 889, 27, 33.6

[56] References Cited

UNITED STATES PATENTS

| | | | |
|---|---|---|---|
| 3,402,140 | 9/1968 | Bicket et al. | 260/38 |
| 3,470,127 | 9/1969 | Snell et al. | 260/336 |
| 3,492,372 | 1/1970 | Flanagan | 260/897 |
| 3,700,758 | 10/1972 | Johnson et al. | 260/897 A |

*Primary Examiner*—Carman J. Seccuro

*Attorney, Agent, or Firm*—Clyde L. Tootle; Daniel B. Reece, III

[57] ABSTRACT

The hot melt pressure sensitive adhesives of the present inventions are blends comprising amorphous polyolefin, a low molecular weight substantially amorphous elastomer, a liquid tackifying resin, and crystalline polypropylene. These pressure sensitive adhesives have a novel combination of properties including good adhesive properties at low temperatures.

8 Claims, No Drawings

HOT MELT PRESSURE SENSITIVE ADHESIVES

This invention relates to hot melt pressure sensitive adhesives. One aspect of this invention concerns a hot melt pressure sensitive adhesive having a novel combination of properties. Another aspect of this invention concerns a pressure sensitive adhesive that has good cohesive and adhesive properties over a wide range of temperatures.

Pressure sensitive adhesives that have good tack and adhere to numerous substrates are widely used in industry for various applications such as in product assembly. For example, one such application is in the automotive industry. The automotive industry uses solvent based pressure sensitive adhesives to adhere a rubber weatherstrip around automobile trunk decks, to adhere carptes to the painted surfaces of automobile floors, and to bond vinyl covers to automobile metal roofs. Although these solvent based pressure sensitive adhesives provide adequate adhesive properties, they have the disadvantages of requiring a double application of adhesive, i..e., a priming application and a final application of adhesive, as well as solvent removal which is both time consuming and presents pollution problems. therefore, it would be desirable to have a hot melt pressure sensitive adhesive that has both high temperature and low temperature balance of adhesive properties without the disadvantages associated with solvent based adhesives.

It is, therefore, an object of the present invention to provide a novel pressure sensitive adhesive.

Another object of this invention is to provide a pressure sensitive adhesive that has a good balance of properties including a lower melt viscosity than adhesives which contain high-molecular weight rubbers.

A further object of the present invention is to provide a pressure sensitive adhesive which has good adhesion to rubber, painted metal surfaces and other impervious substrates.

Another and further object of this invention is to provide an adhesive having good adhesion properties which can be applied without the use of a solvent.

A still further object of the invention is to provide an adhesive having a long open time which allows for proper positioning of the substrates to be bonded.

Another and still further object of this invention is to provide an adhesive which is more thermally stable than hot melt adhesives containing certain thermoplastic rubbers.

A one still further object of the invention is to provide an adhesive having good thermal stability and which has an open time sufficient to be useful as a pressure sensitive adhesive.

In accordance with the present invention we have found that a blend comprising amorphous polyolefin, a low molecular weight elastomer, a liquid tackifying resin, and crystalline polypropylene provides a hot melt pressure sensitive adhesive which can be applied without solvents and has a novel combination of properties including good adhesive properties at low temperature, improved stability and sufficient open times.

The amorphous polyolefin useful in this invention is an essentially noncrystalline hexane soluble polyolefin, such as amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid amorphous polypropylene has a viscosity of about 1,000 to about 50,000 centipoise (190° C. — Brookfield Thermosel method) and preferably from about 3,000 to about 15,000 centipoise. The amorphous polyolefin can contain crystalline, hexane insoluble polyolefin up to an amount of about 30 weight percent. On such commercially available amorphous polyolefin useful in the present adhesives is Eastobond M-5 available from Eastman Chemical Products, Inc. The amorphous polypropylene component is contained in the adhesive compositions of this invention in an amount of about 40 percent to about 70 percent by weight and preferably about 45 percent to about 55 percent by weight. The amorphous polyolefin component can also be an amorphous, hexane soluble propylene-alphamonoolefinic copolymer. These amorphous copolymers are formed in varying amounts during the production of crystalline propylene-alphamonoolefinic copolymers by stereospecific polymerization of propylene and a different alpha-monoolefin by a process as disclosed in U.S. Pat. No. 3,529,037, incorporated herein by reference. These amorphous copolymers can also contain various amounts of hexane insoluble polymer up to an amount of about 30 weight percent. These amorphous polymers can also be produced directly, i.e., without production of crystalline copolymer by polymerizing a mixture of propylene and butene-1 in mineral spirits at a temperature of 140° C. to about 250° C. and a pressure in the range of about atmospheric to about 2,000 psig. with the catalyst containing an organopolylithium aluminum compound and the HA form of titanium trichloride in a mole ratio of 0.01–0.05/0.1–1.0/1 by a polymerization process as disclosed in U.S. Pat. No. 3,679,775 which disclosure is incorporated herein by reference. Methods of preparation of the organopolylithium aluminum compounds are also disclosed in U.S. Pat. No. 3,679,775. One example of amorphous copolymers useful in the present invention is amorphous propylene-butene copolymers containing from about 30 percent to about 75 weight percent of butene-1, and having a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78° to 120° C., and a differential scanning calorimeter melting point not greater than 120° C.

The low molecular weight elastomers are substantially amorphous elastomers having a Tg (glass transition temperature) below −30° C. Such elastomers are polyisobutylene and copolymers of isobutylene. The polyisobutylenes particularly useful in the adhesive compositions of this invention are highly paraffinic hydrocarbon polymers composed of long straight-chain molecules having terminal unsaturation only. Such polymers are commercially available under the trade name Vistanex from Exxon Chemical Company having a Staudinger molecular weight of 20,000 to 80,000. The preferred isobutylene polymer is "butyl rubber". The term "butyl rubber" as used herein is intended to define rubbery copolymers of isobutylene with a diolefin containing 4 to 14 carbon atoms, usually isoprene, but diolefins such as butadiene, dimethyl butadiene and pentadiene may also be used, said copolymers containing 85 to 99.5 parts by weight of the olefin and 15 to 0.5 parts by weight of the diolefin. For example, Vistanex LM-MS and LM-MH which have viscosity average molecular weights of about 35,000 and abut 46,000, respectively, are particularly useful in the adhesive composition of this invention. The low molecular weight elastomer, such as polyisobutylene, can be used in amounts of about 15 percent to 50 percent by weight of the adhesive composition, preferably about 25 percent to about 35 percent by weight.

The liquid tackifying resins useful in the adhesive compositions of this invention can be a liquid hydrocarbon or ester resin tackifier having a glass transition temperature below 0° C. such as liquid DAC-B hydrocarbon resin prepared according to the process disclosed in U.S. Pat. No. 3,701,760 as well as other liquid hydrocarbon resins, synthetic polyterpencs, resin esters and the like. Examples of such other hydrocarbon resins include methyl abietate and other liquid, natural esters and homo- and copolymers of ethylenically unsaturated monomers, such as poly(butadiene-co-isobutene) and poly(2-butene-copiperylene) and liquid polyisobutylene, such hydrocarbon resins having a molecular weight of about 200–50,000. An example of such commercially available hydrocarbon resin of this type is Wingtack 10, sold by the Goodyear Tire and Rubber Company.

The liquid tackifying resins can be used either alone or in combination with each other. However, in general, better results are obtained using only one resin such as a hydrocarbon resin. The tackifying resin can be used in amounts of about 5 percent to about 30 percent by weight of the adhesive composition, preferably about 15 percent to about 25 percent by weight.

The crystalline, hexane insoluble polypropylenes useful in this invention are produced by the polymerization of propylene in the presence of stereospecific catalysts. One method for preparing these polypropylenes is disclosed in U.S. Pat. No. 3,679,755. These polypropylenes are predominantly crystalline; however, they may contain a small amount of amorphous polypropylene, i.e., up to about 10 percent by weight. These polypropylenes have melt flow rates of 4–200 as measured according to ASTM D-1238, preferably 20–100 melt flow rate. These crystalline polypropylenes can be used in amount of about 1.0 percent to about 2.0 percent by weight of the adhesive composition, preferably about 1.0 percent of about 1.5 percent by weight.

The adhesive compositions of this invention are prepared by blending together the four components in the melt at a temperature of about 320° F. to about 400° F. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions.

In addition to the four components, it is desirable for the adhesive compositions to contain about 0.1 percent to about 1.5 percent by weight, preferably about 0.25 percent to 1.0 percent by weight, of one or more antioxidants. Antioxidants that are effective for the various components, especially the elastomer and the amorphous polypropylene, can be used. Such antioxidants include, for example, tris(di-t-butyl-p-hydroxybenzyl)-trimethylbenzene (Ionox 220 and 330), 6-di(t-butyl)-p-cresol (Dalpac 4C2 ), alkylated bisphenol (Naugawhite), zinc dibutyl dithiocarbamate (Butyl Zimate), 4,4'-methylene bis(2,6-di-tert-butylphenol) (Ethyl 702), tetrakis[methylene(3,5-di-tert-butyl-4-hydroxyhydrocinnamate)methane] (Irganox 1010), and dilauryl 3,3'-thiodipropionate (Plastanox DLTDP).

Additives such as pigments, colorants, fillers and the like can also be added to the adhesive compositions of the present invention.

The adhesive compositions of this invention, which are useful for attaching weatherstripping to automobile bodies should have a melt viscosity of 5,000-10,000 cp. at the application temperature (<100,000 cp. acceptable), an open time of at least 5 min., a bond strength of at least 4 lb./in. bond width, a bond failure temperature of >160° F. (preferably >212° F.), and good low temperature impact resistance and flexibility. For attaching weatherstripping around the trunks of automobiles, the high bond failure temperatures are not required.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A hot melt pressure sensitive adhesive is made in a 500 ml. resin flask fitted with an anchor blade strirrer under nitrogen using the following components:

| | |
|---|---|
| 48.25 grams (48.25 percent) by weight) | Amorphous Polypropylene (viscosity = 3,000 centipoise at 190° C.) |
| 20.0 grams (20 percent by weight) | Liquid hydrocarbon resin (Wingtack 10) |
| 30.0 grams (30 percent by weight) | Polyisobutylene (Vistanex LM-MS) |
| 1.25 grams (1.25 percent) | Crystalline polypropylene (melt flow rate of 57 - ASTM D1238) |
| 0.25 grams (0.25 percent | Irganox 1010 |
| 0.25 grams (0.25 percent by weight) | Plastanox DLTDP |

The above materials are added to the flask and are heated with an electric heating mantle to a temperature of 350° F. with stirring. The mixture is blended one hour at 350 F. to obtain a homogeneous mass. The adhesive is then poured onto a Teflon sheet and allowed to cool. The melt viscosity is 5,200 centipoise at 350° F.

This adhesive is evaluated by adhering a rubber gasket weatherstrip to an acrylic enamel painted metal panel. The adhesive is placed in a Hot Shot No. 1 glue gun and heated to 350° F. Two beads of adhesive, 2 inches long, are applied to the panel. After waiting 2.5 minutes the rubber strip of the same length is hand pressed into each bead of adhesive.

Three panels are prepared as above. The three panels are then placed in an oven preheated to 165° F. with one panel horizontally inverted with the rubber facing down, one panel hung vertically and one panel placed at 45° to the horizontal. The effect of heat is observed on all panels during a 20 minute exposure. The movement of adhesive or falling of strips is recorded. If the results ae satisfactory, the panels are retested at elevated temperature in increments of 25° F. up to a temperature where the specimen fails. The adhesive fails at 240° F. on the panel hanging vertically.

The bond strength and open time are measured as follows: Apply the adhesive at 350° F. in bead form to acrylic enamel painted test panels (3 in. × 9 in.). Three one-inch wide pieces of weatherstrip are then pressed into the adhesive bead after a 2.5 minutes open time (wait period). Prepare similar bonds after 5 to 10 minutes open times. Bond strength of these specimens, after being aged 24 hours at 72° F., are measured on an Instron tensile tester using a testing rate of one inch per minute. This product shows a bond strength averaging 5.9 pounds per inch-bond width at an open time of 5 minutes.

The low temperature properties of the adhesive are determined by applying the adhesive at 350° F. in bead form to acrylic enamel painted metal test panels (12 in. × 12 in.). Two inch wide pieces are then pressed into the adhesive after a period of 5 minutes. The bonds are then conditioned at −20° F. for 1.5 hours after which the impact resistance of the bonds are determined by slamming the conditioned bonds against a fixed support. This adhesive shows good adhesion to the rubber and to the painted metal surface with no failure after 10 impacts.

EXAMPLE 2

A hot melt pressure sensitive adhesive is prepared the same as described in Example 1 except that only amorphous polypropylene, polyisobutylene (Vistanex LM-MS), crystalline polypropylene, and Irganox 1010 are used. The amounts used are 48.25 weight percent amorphous polypropylene, 50 weight percent polyisobutylene, 1.5 weight percent crystalline polypropylene, and 0.25 weight percent Irganox 1010 antioxidant.

Testing of this adhesive as described in Example 1 shows the following results.

| | |
|---|---|
| Melt Viscosity | 20,000 cp. at 350° F. |
| Bond Strength, pounds/inch | 4.1 after 5 min. open time |
| Bond Elevated Temperature Resistance | Fail at 215° F. |
| Bond Impact Resistance at −20° F. | Good adhesion No brittleness (Pass) |

This example shows good adhesive properties but bond strength is borderline.

EXAMPLE 3

A hot melt pressure sensitive adhesive is prepared in the same manner as described in Example 1 using 53.19 weight percent amorphous polypropylene, 9.97 weight percent hydrocarbon resin (Wingtack 10), 34.90 weight percent polyisobutylene (Vistanex LM-MS), 1.60 weight percent crystalline polypropylene, 0.18 weight percent dilauryl 3,3′-thiodipropionate, and 0.17 weight percent tris(nonylphenyl)phosphite antioxidants. This adhesive shows good tensile strength and good low temperature bond impact resistance.

EXAMPLE 4

A hot melt pressure sensitive adhesive is prepared in the same manner as described in Example 1 using 62.75 weight percent amorphous polypropylene, 5 weight percent hydrocarbon resin (Wingtack 10), 30 weight percent polyisobutylene (Vistanex LM-MS), 2.0 weight percent crystalline polypropylene, and 0.25 weight percent Ethyl 702 antioxidant. This adhesive shows fair tensile strength and good low temperature bond impact resistance.

EXAMPLE 5

A hot melt pressure sensitive adhesive is prepared in the same manner as described in Example 1 using 24.25 weight percent amorphous polypropylene, 30 weight percent hydrocarbon resin (Wingtack 10), 45 weight percent polyisobutylene (Vistanex LM-MS), and 0.75 weight percent crystalline polypropylene. This adhesive shows very poor bond strength but has cold flexibility and impact resistance.

EXAMPLE 6

A hot melt composition is prepared as described in Example 1 except that the composition contains 97.0 weight percent amorphous polypropylene and 3 weight percent polyisobutylene (Vistanes LM-MS). This composition provided no bond formation and was unacceptable as an adhesive.

EXAMPLE 7

A hot melt composition is prepared as described in Example 1 except that the composition contains 97.0 weight percent amorphous polypropylene, 1.5 weight percent crystalline polypropyene and 1.5 weight percent methyl abietate. This composition provided no bond formation and was unacceptable as an adhesive.

The hot melt pressure sensitive adhesive of Example 1 is used to seal the rubber gasket around the trunk deck of an automobile. A good bond is formed between the rubber gasket an the painted metal body as evidenced by no water leaks showing up in a washing operation.

Although the invention has been described in considerable detail with particular reference to certain preferred embodiments thereof, variations and modifications can be effected within the spirit and scope of the invention.

We claim:

1. An adhesive composition capable of being used as a hot melt adhesive for securing rubber members to metal surfaces comprising a blend of (1) 40 to 70 weight percent amorphous polyalphaolefin selected from the group consisting of amorphous polypropylene and amorphous propylene-alpha-mololefin copolymer, (2) 5 to 30 weight percent of at least one tackifying resin liquid at ambient temperatures selected from the group consisting of low molecular weight hydrocarbon resin or liquid natural ester resin tackifier, (3) 15 to 50 weight percent of a low molecular weight substantially amorphous elastomer comprising homopolymers and copolymers of isobutylene having a glass transition temperature below −30° C., and (4) 1 to 2 weight percent crystalline polypropylene having a melt flow rate of 4-200 (ASTM D-1238).

2. An adhesive composition according to claim 1 wherein said poly-alpha-olefin is polypropylene.

3. An adhesive composition according to claim 2 wherein said tackifying resin is a low molecular weight hydrocarbon resin.

4. An adhesive composition according to claim 3 wherein said amorphous elastomer is polyisobutylene.

5. An adhesive composition capable of being used as a hot melt adhesive for securing rubber members to metal surfaces comprising a blend of (1) 45 to 55 weight percent amorphous polyalphaolefin selected from the group consisting of amorphous polypropylene and amorphous propylene-alpha-monolefin copolymer (2) 15 to 25 weight percent of at least one tackifying resin liquid at ambient temperatures selected from the group consisting of low molecular weight hydrocarbon resin or liquid natural ester resin (3) 25 to 35 weight percent of a low molecular weight substantially amorphous elastomer consisting essentially of homopolymers and copolymers of isobutylene having a glass transition temperature below —30° C., and (4) 1 to 1.5 weight percent crystalline polypropylene having a melt flow rate of 20–100 (ASTM D-1238).

6. An adhesive composition according to claim 5 wherein said poly-alpha-olefin is polypropylene.

7. An adhesive composition according to claim 6 wherein said tackifying resin is a low molecular weight hydrocarbon resin.

8. An adhesive composition according to claim 7 wherein said amorphous elastomer is polyisobutylene.

* * * * *